| (12) | United States Patent | (10) Patent No.: | US 12,312,220 B2 |
|---|---|---|---|
| | Sasaoka et al. | (45) Date of Patent: | May 27, 2025 |

(54) WORK MACHINE COLLISION SAFETY CONTROLS AND WARNINGS

(71) Applicant: KOBELCO CONSTRUCTION MACHINERY CO., LTD., Hiroshima (JP)

(72) Inventors: Yoshio Sasaoka, Tokyo (JP); Tomofumi Okada, Tokyo (JP)

(73) Assignee: Kobelco Construction Machinery Co., Ltd., Hiroshima (JP)

(*) Notice: Subject to any disclaimer, the term of this patent is extended or adjusted under 35 U.S.C. 154(b) by 833 days.

(21) Appl. No.: 17/602,105

(22) PCT Filed: Mar. 4, 2020

(86) PCT No.: PCT/JP2020/009200
§ 371 (c)(1),
(2) Date: Oct. 7, 2021

(87) PCT Pub. No.: WO2020/235176
PCT Pub. Date: Nov. 26, 2020

(65) Prior Publication Data
US 2022/0194757 A1 Jun. 23, 2022

(30) Foreign Application Priority Data
May 21, 2019 (JP) .................. 2019-095261

(51) Int. Cl.
*B66C 23/90* (2006.01)
*B66C 13/46* (2006.01)
(Continued)

(52) U.S. Cl.
CPC ............ *B66C 23/905* (2013.01); *B66C 13/46* (2013.01); *B66C 23/94* (2013.01); *G06V 20/58* (2022.01)

(58) Field of Classification Search
None
See application file for complete search history.

(56) References Cited

U.S. PATENT DOCUMENTS 10,618,780 B2   4/2020   Ishikawa et al.
11,047,113 B2   6/2021   Izumikawa
(Continued)

FOREIGN PATENT DOCUMENTS

EP   3 477 006 A1   5/2019
JP   107-215678 A   8/1995
(Continued)

OTHER PUBLICATIONS

Machine translation of JP 2018021374 A Specification (Year: 2018).*
(Continued)

*Primary Examiner* — Hussein Elchanti
*Assistant Examiner* — Kenneth M Dunne
(74) *Attorney, Agent, or Firm* — Carrier, Shende & Associates P.C.; Joseph P. Carrier; Fulchand P. Shende (57) ABSTRACT

The present invention provides a work machine in which load shaking of a crane in emergency can be prevented. In the work machine, a turning body is disposed to be turnable relative to a base body. The work machine includes a drive control unit which controls a turning operation of the turning body, and a detection unit which detects an obstacle present around the turning body. The drive control unit does not start turning of the turning body in a case where the obstacle is detected by the detection unit while the turning of the turning body is stopped, and maintains the turning of the turning body for at least a predetermined period in a case where the obstacle is detected by the detection unit during the turning of the turning body.

3 Claims, 9 Drawing Sheets

(51) Int. Cl.
*B66C 23/94* (2006.01)
*G06V 20/58* (2022.01)

(56) References Cited

U.S. PATENT DOCUMENTS

| | | | | |
|---|---|---|---|---|
| 2007/0164873 | A1* | 7/2007 | Yamada | E02F 9/26 340/679 |
| 2013/0345857 | A1* | 12/2013 | Lee | B66C 13/48 700/229 |
| 2014/0118533 | A1* | 5/2014 | Chang | E02F 9/261 348/118 |
| 2014/0121840 | A1* | 5/2014 | Mizuochi | G06F 30/15 700/275 |
| 2017/0233229 | A1* | 8/2017 | Burke | G08B 21/02 340/685 |
| 2018/0347147 | A1 | 12/2018 | Doi et al. | |
| 2019/0345010 | A1* | 11/2019 | Shan | B66C 13/46 |
| 2019/0360172 | A1 | 11/2019 | Yamamoto | |
| 2021/0010243 | A1* | 1/2021 | Fukuoka | E02F 9/261 |
| 2021/0171324 | A1* | 6/2021 | Zhao | B66C 23/905 |
| 2021/0179397 | A1* | 6/2021 | Hayashi | H04N 7/181 |
| 2021/0206605 | A1* | 7/2021 | Rotem | B66C 13/063 |
| 2021/0246626 | A1* | 8/2021 | Yamamoto | G08B 21/24 |
| 2021/0388578 | A1* | 12/2021 | Saito | E02F 9/2033 |

FOREIGN PATENT DOCUMENTS

| | | | |
|---|---|---|---|
| JP | 2002-250055 A | 9/2002 | |
| JP | 2011-037566 A | 2/2011 | |
| JP | 2011-063358 A | 3/2011 | |
| JP | 2013-193825 A | 9/2013 | |
| JP | 2018-020898 A | 2/2018 | |
| JP | 2018021374 A * | 2/2018 | ............ B66C 23/88 |
| JP | 2018-095359 A | 6/2018 | |
| JP | 6389087 B2 | 9/2018 | |
| JP | 2018-167982 A | 11/2018 | |
| JP | 2018-199989 A | 12/2018 | |
| WO | 2018/084146 A1 | 5/2018 | |
| WO | 2018/155567 A1 | 8/2018 | |

OTHER PUBLICATIONS

Office Action dated Jun. 27, 2023 issued in the corresponding Japanese Patent Application No. 2019-095261 with the English machine translation thereof.

Extended European search report dated Jun. 20, 2022 issued in the corresponding EP Patent Application No. 20808630.6.

Office Action (Decision of Dismissal of Amendment) dated Nov. 19, 2024 issued in the corresponding Japanese Patent Application No. 2023-188759 with the English machine translation thereof.

* cited by examiner

WORK MACHINE COLLISION SAFETY CONTROLS AND WARNINGS

TECHNICAL FIELD

The present invention relates to a work machine such as a hydraulic crane capable of suspending a suspended load with a rope.

BACKGROUND ART

In a turning operation of a crane, it has been a common practice to detect an obstacle by a sensor to avoid contact with the obstacle. As such a crane, Patent Literature 1 discloses a crane including an obstacle sensor which detects an obstacle approaching to a front part of a running body during running, and detects an obstacle approaching to a rear part of a turning body during working (see Patent Literature 1).

CITATION LIST

Patent Literature

Patent Literature 1: Japanese Patent Laid-Open No. 2018-95359

SUMMARY OF INVENTION

Technical Problem

In a crane of Patent Literature 1, for example, when a person enters a range of a blind spot of a cabin during a turning operation of the crane, the turning operation of the crane is stopped.

When the turning operation of the crane stops, a suspended load of the crane is swung like a pendulum, that is, so-called load shaking occurs. As an example of problems, there is concern that the load shaking, if occurs, causes an event that requires attention, such as the suspended load coming into contact with a building or the like.

An object of the present invention, which has been made in view of the above prior art problem, is to provide a work machine in which load shaking of a crane in emergency or the like can be prevented.

Solution to Problem

To achieve such an object, a work machine of the present invention is a work machine in which a turning body is disposed to be turnable relative to a base body, and includes a drive control unit which controls a turning operation of the turning body, and a detection unit which detects an obstacle present around the turning body, and the drive control unit does not start turning of the turning body for at least a predetermined period in a case where the obstacle is detected by the detection unit while the turning of the turning body is stopped, and maintains the turning of the turning body in a case where the obstacle is detected by the detection unit during the turning of the turning body.

DESCRIPTION OF EMBODIMENTS

Hereinafter, description will be made as to embodiments of the present invention in more detail with reference to the drawings. However, these embodiments may be modified and combined as appropriate. Also, in the following description and accompanying drawings, substantially the same or equivalent parts are denoted with the same reference signs for description.

Embodiment 1

Figure 1:
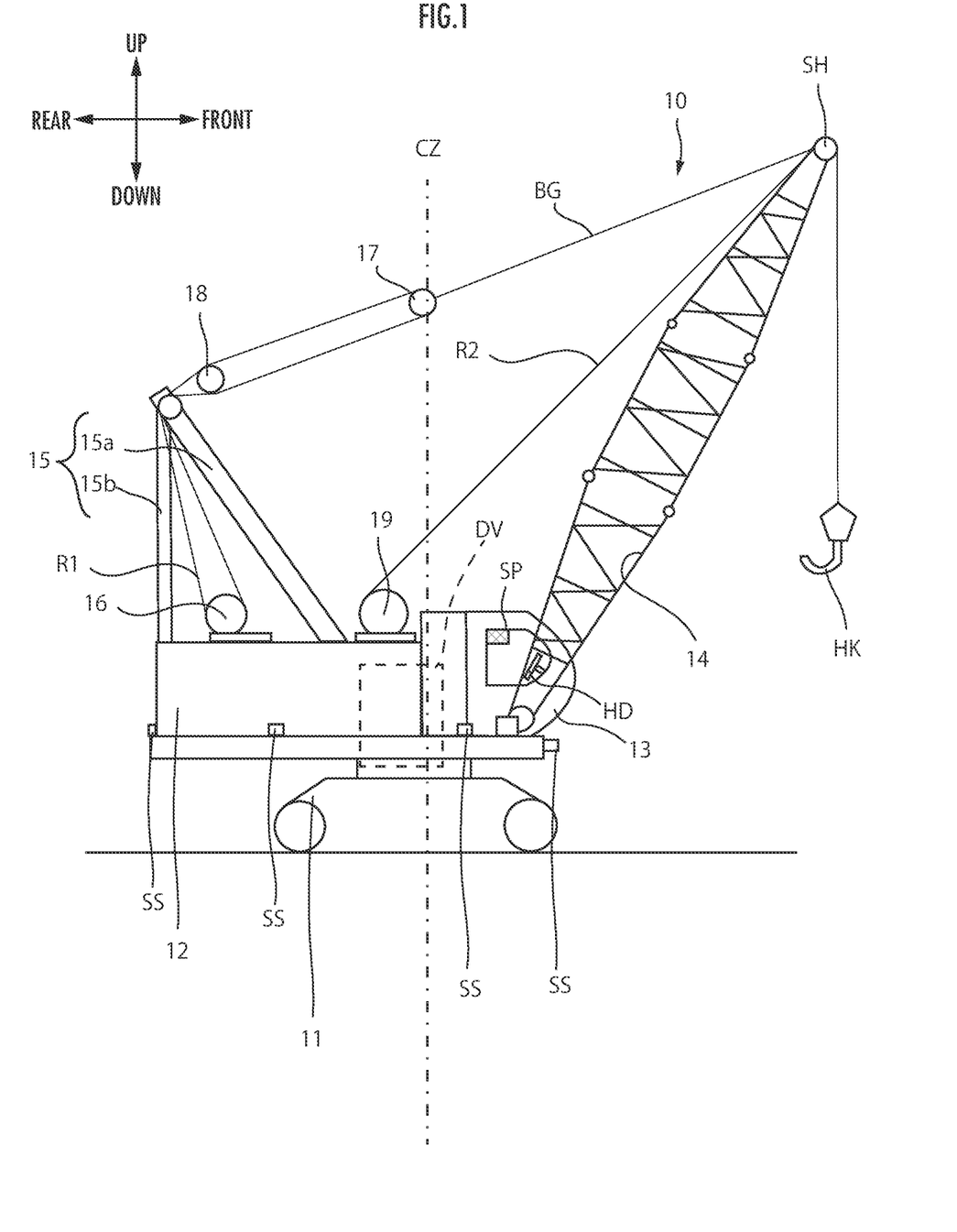
FIG. 1 is a side view of a work machine according to Embodiment 1.

FIG. 1 is a side view of a crane device 10 as a work machine according to Embodiment 1. Note that arrows in the drawing show an up-down direction and a front-rear direction of the crane device 10. As shown in FIG. 1, the crane device 10 includes a running body 11 as a base body. The running body 11 is of a crawler type which moves the crane device 10 forward or backward.

A turning body 12 is located on the running body 11 to be turnable relative to the running body 11. The turning body 12 is located to be turnable relative to the running body 11 in a direction around a turning axial center CZ.

A drive unit DV is located in the turning body 12. The drive unit DV comprises a turning motor (not shown) which can turn the turning body 12 relative to the running body 11. For example, the turning motor is driven with hydraulic oil from a hydraulic generator (not shown) including a hydraulic pump to be driven with a driving force of an engine (not shown), and the turning body 12 is accordingly turnable.

A driver's cab 13 is arranged forward in a front-rear direction of the crane device 10 (front-rear direction of the arrows in FIG. 1) in the turning body 12. In the driver's cab 13, a handle HD which can be operated by an operator during a turning operation of the turning body 12 is located. Also, in the driver's cab 13, a display (not shown) is located to display a control state of the turning operation of the turning body 12.

A boom 14 is arranged forward of the crane device 10 in the turning body 12. The boom 14 is a lattice boom including a truss structure. The boom 14 is coupled to a front part of the turning body 12 to be, for example, movable above and below the turning body 12. The boom 14 comprises, in a lower end portion, a boom foot as a fulcrum to be pivoted (supported) rotatably by the turning body 12.

A gantry 15 is arranged behind the crane device 10 in the turning body 12. The gantry 15 includes a compression member 15a and a tension member 15b.

The compression member 15a is a brace vertically disposed inclined upward and rearward from a central portion of the turning body 12. The tension member 15b is a brace disposed perpendicularly upward from a rear end portion of the turning body 12. The tension member 15*b* has a base end fixed to the turning body 12, and a tip connected to a tip of the compression member 15*a*.

A boom raising and lowering winch 16 is disposed in the turning body 12. A boom raising and lowering rope R1 is wound around the boom raising and lowering winch 16 so that the rope can be pulled out or wound up.

An upper spreader 17 and a lower spreader 18 are arranged between the gantry 15 and the boom 14. Each of the upper spreader 17 and the lower spreader 18 comprises a plurality of sheaves. Furthermore, the upper spreader 17 is connected to a tip of the boom 14 by a boom guy line BG.

The boom raising and lowering rope R1 is hung around between the lower spreader 18 and the upper spreader 17 a plurality of times. Therefore, the boom 14 is raised while rotating relative to the gantry 15, when the boom raising and lowering rope R1 is wound up by the boom raising and lowering winch 16. Also, the boom 14 is lowered while rotating relative to the gantry 15, when the boom raising and lowering rope R1 is pulled out by the boom raising and lowering winch 16.

A main winding winch 19 is located in the turning body 12. A main winding rope R2 is wound around the main winding winch 19 so that the rope can be pulled out or wound up. The main winding rope R2 has a tip coupled to a hook HK. The main winding rope R2 is hung over between a sheave SH at the tip of the boom 14 and a sheave of a sheave block (not shown) located in the hook HK.

The hook HK rises relative to the boom 14 when the main winding rope R2 is wound up by the main winding winch 19. Also, the hook HK lowers relative to the boom 14 when the main winding rope R2 is pulled out by the main winding winch 19.

Sensors SS are provided at six positions around the turning body 12. Specifically, the sensors SS are provided in front of, behind, at two right positions of and at two left positions of the turning body 12. The sensors SS can detect obstacles present around the turning body 12, for example, in a predetermined range within a working radius. That is, each sensor SS functions as a detection unit.

As the sensor SS, for example, an infrared camera, an infrared sensor, a millimeter wave radar, ultrasonic waves or the like may be used. In addition, the obstacles include, for example, a moving body such as a person, a bicycle or a car, and a building. Furthermore, examples of the building are not limited to an existing building, and also include a building under construction and a building being demolished.

In addition, the sensor SS is installed in the turning body 12 to face a ground side. Thus, the sensor SS is installed, so that it is possible to detect the obstacle in a range from a turning body 12 side to the ground. Also, the sensor SS may be configured to detect the obstacle which might come into contact with the turning body 12 during the turning operation of the turning body 12. For example, in a case where a height of the obstacle is smaller than a height from the ground to an end portion of the turning body 12 on the ground side, there is no concern that the obstacle comes into contact with the turning body 12. Therefore, for example, the sensor SS may be configured to detect the obstacle higher than a height of the running body 11.

A speaker SP is located in the driver's cab 13 of the turning body 12. The speaker SP emits a warning sound based on the detection of the obstacle by the sensor SS. The warning sound may be, for example, alarm such as buzzer or siren, or may be voice guidance notifying presence of the obstacle. Thus, the speaker SP functions as a notification unit which notifies that the obstacle is present around the turning body 12.

Figure 2:
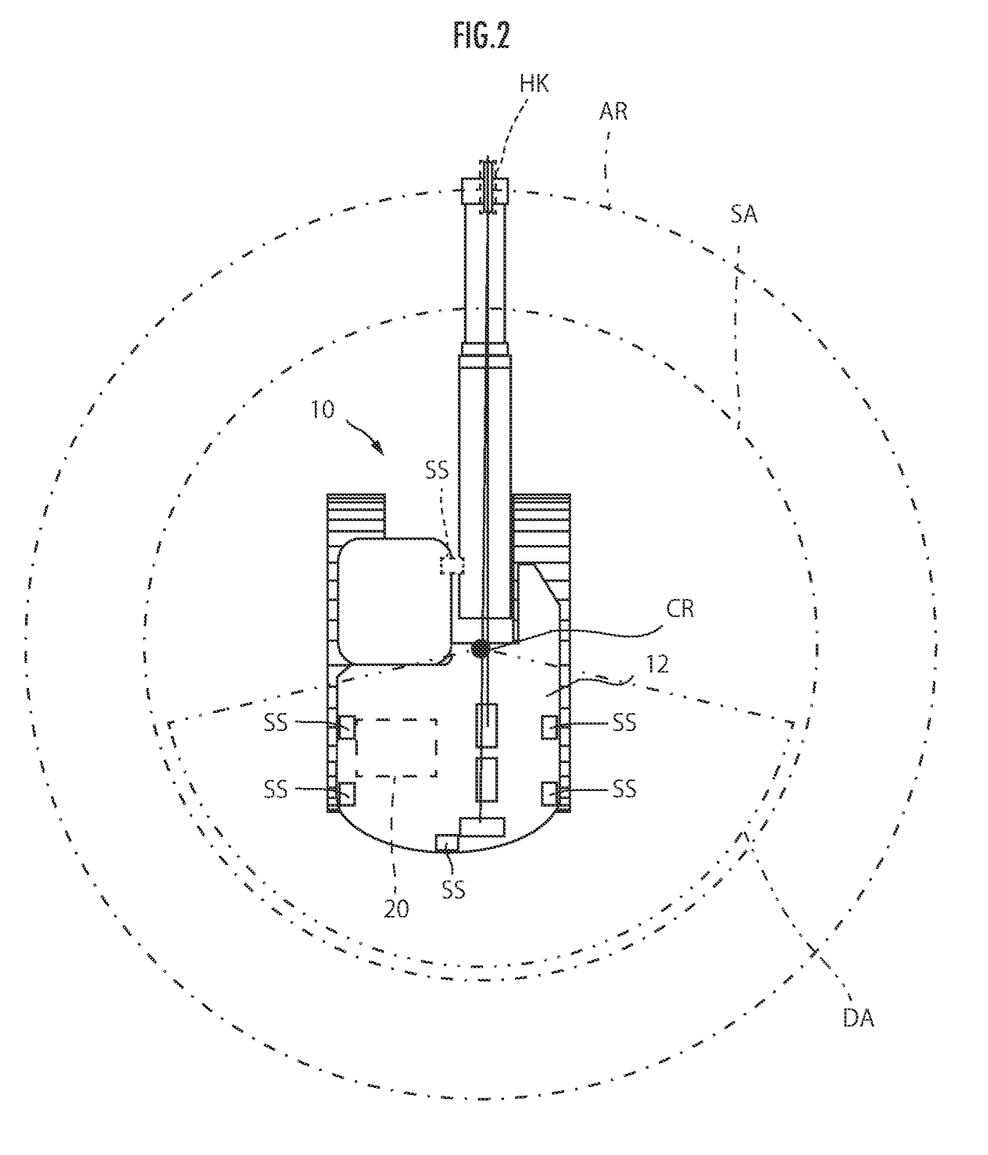
FIG. 2 is a plan view of the work machine according to Embodiment 1.

FIG. 2 is a plan view of the crane device 10. A dashed line in the drawing shows a working radius AR of the crane device 10. Note that the working radius AR is calculated from a horizontal distance between a turning center CR of the turning body 12 and a vertical line extending downward from a center of the hook HK. Therefore, the working radius AR may change with an inclination of the boom 14.

A dashed line shown inside the working radius AR in the drawing shows an example of a sensing area SA as a range where the sensor SS can detect the obstacle. A double-dashed line in the drawing shows an example of a danger area DA as a range where the obstacle is easy to come into contact with the turning body 12 during the turning, if any. The danger area DA may be set to a predetermined range on a rear side of the turning body 12, for example, because the rear side of the turning body 12 is a blind spot from the operator boarding the driver's cab 13.

In this case, the danger area DA may change with a turning position of the turning body 12. In this drawing, the danger area DA is set to a range in the working radius AR where an angle formed in the turning center CR seen from a boom 14 side is 160 degrees. Note that the danger area DA can be arbitrarily determined in accordance with an implementation mode.

As shown in FIG. 2, the turning body 12 can turn about the turning center CR. A control unit 20 controls the turning operation of the turning body 12. The control unit 20 is located in the turning body 12. The control unit 20 is connected to be able to receive detection information of the obstacle from the sensor SS. The control unit 20 can control the turning operation of the crane device based on the detection information of the obstacle from the sensor SS.

Figure 3:
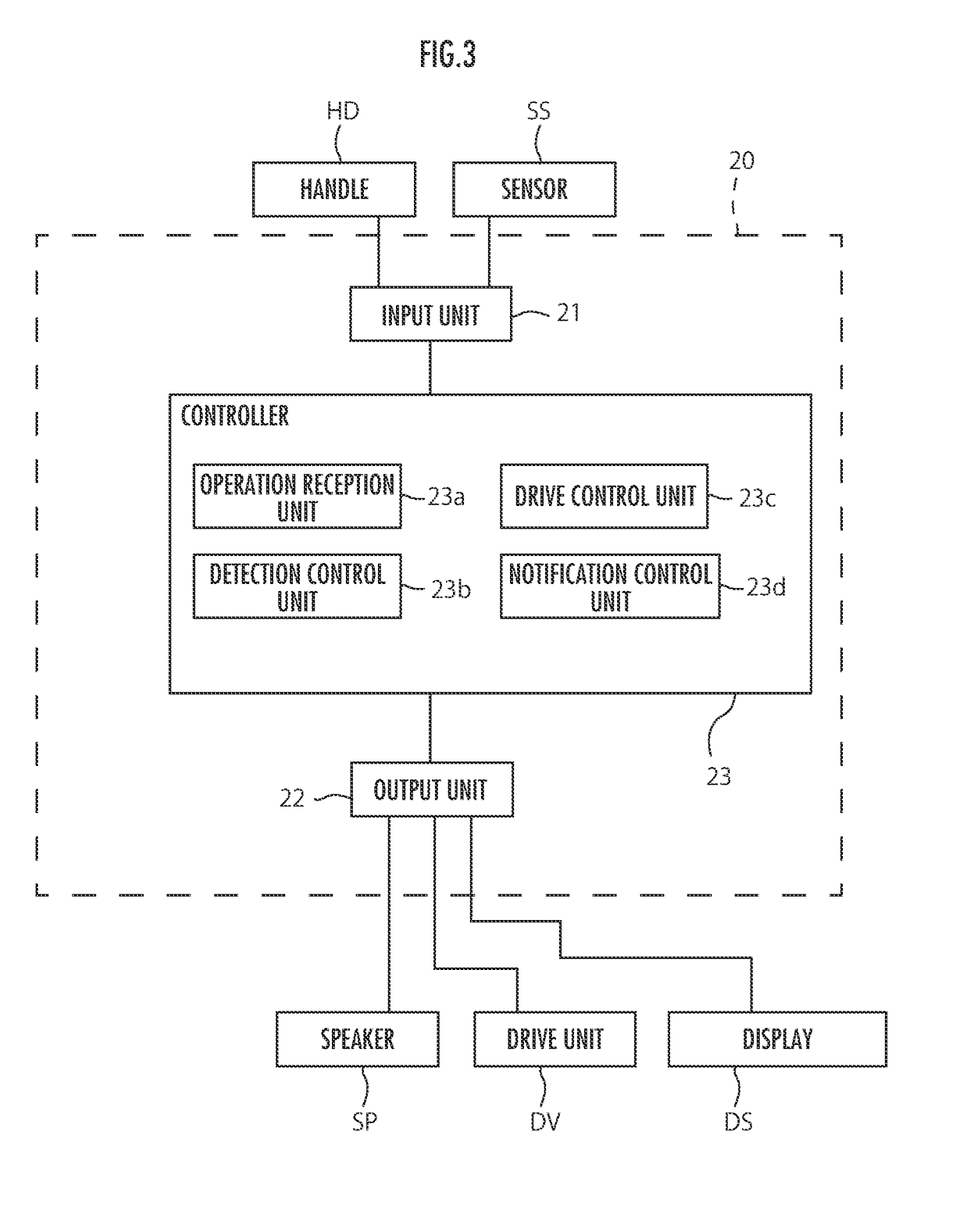
FIG. 3 is a block diagram showing functional blocks of the work machine according to Embodiment 1.

FIG. 3 shows functional blocks of the control unit 20. As shown in FIG. 3, an input unit 21 is an interface unit connected to the handle HD and the sensor SS. The control unit 20 can acquire information of an operation performed to the handle HD via the input unit 21. The control unit 20 can acquire the detection information of the obstacle detected by the sensor SS via the input unit 21. In addition, the input unit 21 is connected to an operation unit (not shown) to be operated by the operator concerning an operation of the engine of the drive unit DV. Therefore, the control unit 20 can acquire operation information on the operation of the engine via the input unit 21.

An output unit 22 is an interface unit connected to the speaker SP, the drive unit DV and a display DS. The control unit 20 can control the speaker SP to output audio via the output unit 22. The control unit 20 can control the drive unit DV via the output unit 22. The control unit 20 can control the display DS to display control information of the turning operation of the turning body 12 via the output unit 22.

A controller 23 is achieved by a computer including a central processing unit (CPU) as an arithmetic processing unit, a read only memory (ROM) as a main memory, and a random access memory (RAM). The CPU reads program depending on processing content from the ROM to develop the program in the RAM, and achieves various functions in cooperation with the developed program.

An operation reception unit 23*a* can acquire, via the input unit 21, whether or not an operation of turning on or off the engine of the drive unit DV of the crane device 10 is performed. Therefore, the operation reception unit 23*a* can determine whether or not the engine of the drive unit DV of the crane device 10 is turned on or off.

The operation reception unit 23a can receive the information of the operation performed to the handle HD via the input unit 21. That is, the operation reception unit 23a can detect whether or not the handle HD is operated by the operator.

The detection control unit 23b can acquire the detection information of the obstacle from the sensor SS via the input unit 21. Also, the detection control unit 23b can calculate a distance from a tip of the turning body 12 to the obstacle and a distance from the tip of the turning body 12 to the building, based on the acquired detection information.

A drive control unit 23c can control an operation of the drive unit DV. The drive control unit 23c can drive the drive unit DV to turn the turning body 12, based on an operation of the handle HD received by the operation reception unit 23a.

The drive control unit 23c can drive the drive unit DV in a plurality of modes, based on the detection information detected by the detection control unit 23b. For example, the drive control unit 23c can maintain or stop the turning operation of the turning body 12, based on the detection information.

A notification control unit 23d can output audio from the speaker SP. For example, the notification control unit 23d can output the warning sound from the speaker SP based on the detection information acquired by the detection control unit 23b.

Figure 4:
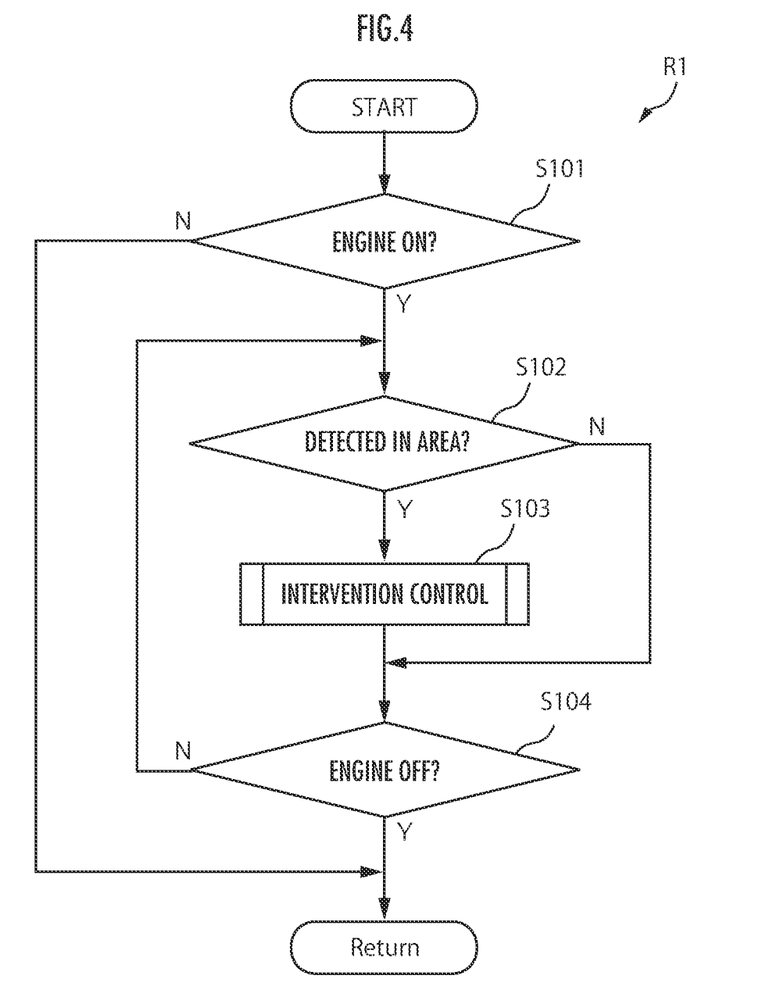
FIG. 4 is a flowchart showing a processing routine of the work machine according to Embodiment 1.

FIG. 4 shows a turning operation intervention processing routine R1 to be performed by the control unit 20. As shown in FIG. 4, the controller 23 determines whether or not the engine of the crane device 10 is turned on (step S101). Note that the determination in the step S101 is not limited to the determination of whether or not the engine is turned on, and may be, for example, determination of whether or not an entrance blockage lever of the crane device 10 is at a work position, or may be, for example, determination of whether or not the entrance blockage lever is put down.

In a case where the controller 23 determines in the determination of the step S101 that the engine of the crane device 10 is not turned on (step S101: N), the controller ends the turning operation intervention processing routine R1.

In a case where the controller 23 determines in the determination of the step S101 that the engine of the crane device 10 is turned on (step S101: Y), the controller determines whether or not the obstacle (moving body) is detected in a predetermined area around the turning body 12, that is, in the danger area DA (step S102). Note that the controller 23 performs the determination of the step S102 based on the detection information acquired from the sensor SS by the detection control unit 23b.

In a case where the controller 23 determines in the step S102 that the moving body is detected in the danger area DA (step S102: Y), the controller performs intervention control to encourage avoidance of an event that requires attention, which might occur when the crane device 10 performs the turning operation, such as the suspended load coming into contact with a building or the like (step S103).

In a case where the controller 23 determines that the intervention control of the step S103 ends or that the moving body is not detected in the danger area DA in the step S102 (step S102: N), the controller determines whether or not the engine of the crane device 10 is turned off (step S104).

In a case where the controller 23 determines in the determination of the step S104 that the engine of the crane device 10 is not turned off (step S104: N), the controller performs the processing and determination of the step S102 to the step S104 again.

In a case where the controller 23 determines in the determination of the step S104 that the engine of the crane device 10 is turned off (step S104: Y), the controller ends the turning operation intervention processing routine R1.

Figure 5:
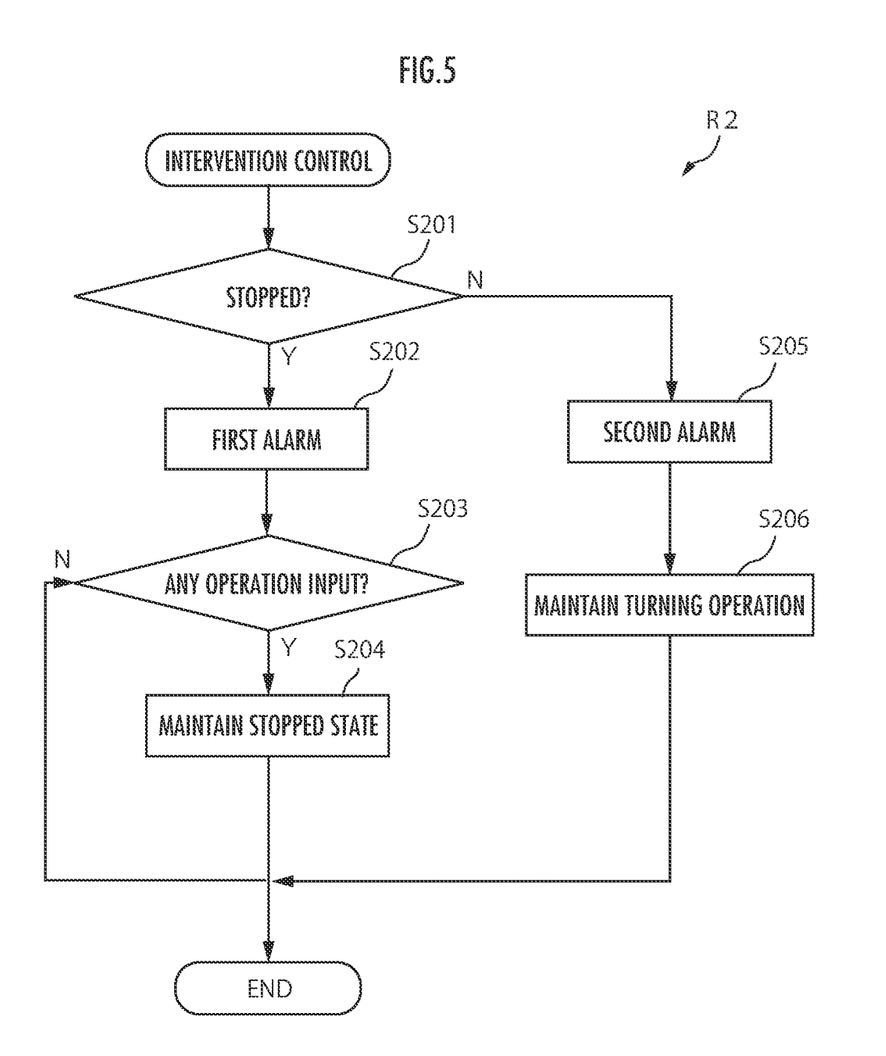
FIG. 5 is a flowchart showing a subroutine of intervention control of FIG. 4.

FIG. 5 shows a subroutine R2 of the intervention control of the step S103 of FIG. 4. As shown in FIG. 5, the controller 23 determines whether or not the turning operation of the turning body 12 is stopped (step S201). Note that the controller 23 performs the determination of the step S201 based on the operation information acquired from the handle HD by the operation reception unit 23a.

In a case where the controller 23 determines in the step S201 that the turning operation of the turning body 12 is stopped (step S201: Y), the controller outputs first alarm from the speaker SP (step S202).

The controller 23 determines whether or not there is operation input of the handle HD by the operator (step S203). Note that the controller 23 performs the determination of the step S203 based on the operation information acquired from the handle HD by the operation reception unit 23a.

In a case where the controller 23 determines in the determination of the step S203 that there is no operation input of the handle HD by the operator (step S203: N), the controller ends the intervention control. That is, the controller 23 does not start turning of the turning body 12, in a case where the obstacle is detected by the sensor SS while the turning of the turning body 12 is stopped.

In a case where the controller 23 determines in the determination of the step S203 that there is the operation input of the handle HD by the operator (step S203: Y), the controller maintains a stopped state of the turning operation (step S204), to end the intervention control. That is, the controller 23 proceeds to the determination of the step S104 of FIG. 4.

This stopped state may be maintained, for example, by canceling the operation input from the handle HD. Alternatively, the stopped state may be maintained, for example, by cutting a signal of the operation input from the handle HD, that is, by cutting a so-called pilot line. That is, the controller 23 does not start the turning of the turning body 12 in a case where the obstacle is detected by the sensor SS while the turning of the turning body 12 is stopped.

In a case where the controller 23 determines in the step S201 that the turning operation of the turning body 12 is not stopped, that is, the turning operation is being performed based on input from the operation reception unit 23a (step S201: N), the controller outputs second alarm from the speaker SP (step S205).

After the step S205, the controller 23 maintains the turning operation for at least a predetermined period (step S206). That is, for example, in a case where an operation of continuing the turning operation is performed to the operation reception unit 23a, the controller 23 maintains the turning operation without intervening in the operation from the operation reception unit 23a. Alternatively, in a case where the operator performs an operation of stopping the turning operation in response to the second alarm, the controller 23 intervenes in the operation, maintains the turning operation for the predetermined period, and stops the turning operation with a predetermined deceleration so that the turning operation is not suddenly stopped. In addition, the predetermined deceleration may be a deceleration to such an extent that the suspended load does not cause load shaking.

Note that the second alarm in the step S205 may convey a higher degree of attention to the contact of the suspended load with the building or the like than the first alarm. For example, the second alarm may output a warning sound in a pattern different from that of the first alarm. Alternatively, the second alarm may be outputted in sound volume larger than that of the first alarm.

As above, according to the crane device 10 of the present embodiment, the controller 23 maintains the turning operation of the turning body 12 without automatically suddenly stopping the turning operation, in a case where the obstacle is detected by the sensor SS during the turning operation of the turning body 12. Therefore, for example, it is possible to prevent occurrence of an event where the turning operation of the turning body 12 suddenly stops in emergency. Consequently, for example, the load shaking in the crane device 10 due to the sudden stop in emergency can be prevented, and occurrence of an event that requires attention, such as the suspended load coming into contact with a building or the like can be prevented.

The speaker SP issues different notifications depending on a mode of the detection of the obstacle by the sensor SS and a mode of the turning operation of the turning body 12, so that the operator can recognize that there is the obstacle based on the notification unit. Therefore, it is possible to encourage the operator to perform the turning operation depending on a situation.

In the present embodiment, description has been made by using the speaker SP as the notification unit. However, the notification unit may only notify the operator by a certain method, and may notify the operator by a light emitting device such as a rotating light. Alternatively, the notification unit may issue a notification by displaying the corresponding situation in the display DS of the driver's cab 13, by vibrating a vibrator (not shown) located in the handle HD of the driver's cab 13, or the like.

It is also described that the controller 23 determines in the step S102 of FIG. 4 whether or not the obstacle is in the danger area DA. However, the range of the danger area DA where the obstacle is to be detected is not limited to a range in the working radius AR, and can be changed with the implementation mode.

It is described with reference to FIG. 5 that processing of outputting the second alarm in the step S205 and then maintaining the turning operation in the step S206 is performed. However, the processing of the step S206 does not have to be performed.

Figure 6:
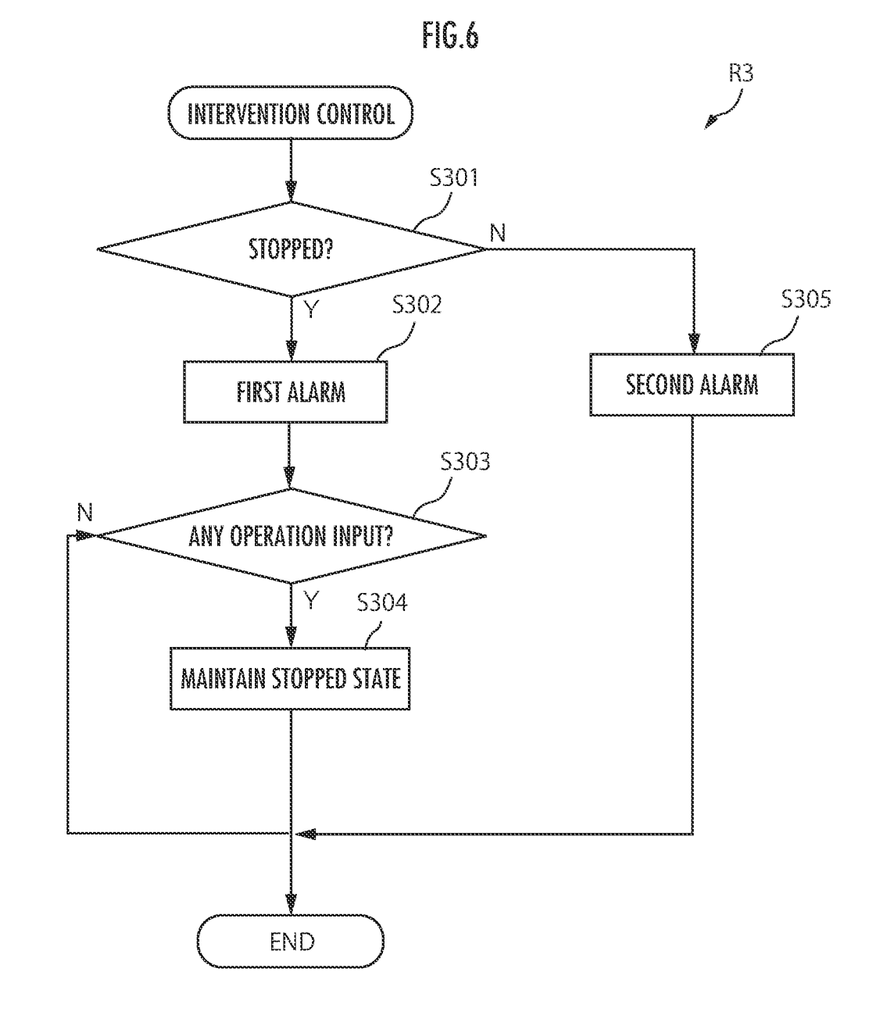
FIG. 6 is a flowchart showing the subroutine of the intervention control of FIG. 4.

FIG. 6 shows a subroutine R3 which is the subroutine of the intervention control of the step S103 of FIG. 4, and is an example different from the subroutine R2. Steps S301 to S305 of the subroutine R3 of FIG. 6 are the same as the steps S201 to S205 of FIG. 5. The subroutine R3 of the intervention control of FIG. 6 is different in that the turning operation maintaining processing as the processing corresponding to the step S206 of the subroutine R2 of the intervention control of FIG. 5 is not performed.

That is, in the intervention control subroutine R3, when the obstacle is detected in the danger area DA during the turning operation of the turning body 12, intervention in the operation from the operation reception unit 23a does not occur, and the turning operation is performed in accordance with the operation to the operation reception unit 23a. Thus, even when the intervention control subroutine R3 is executed, effects similar to those of the intervention control subroutine R2 of FIG. 5 can be obtained.

Embodiment 2

Description will be made as to a crane device 10 according to Embodiment 2. The crane device 10 according to Embodiment 2 is different from the crane device 10 according to Embodiment 1 in intervention control subroutine. The crane device is the same as the crane device 10 according to Embodiment 1 in the other respects, and hence description thereof will not be repeated.

Figure 7:
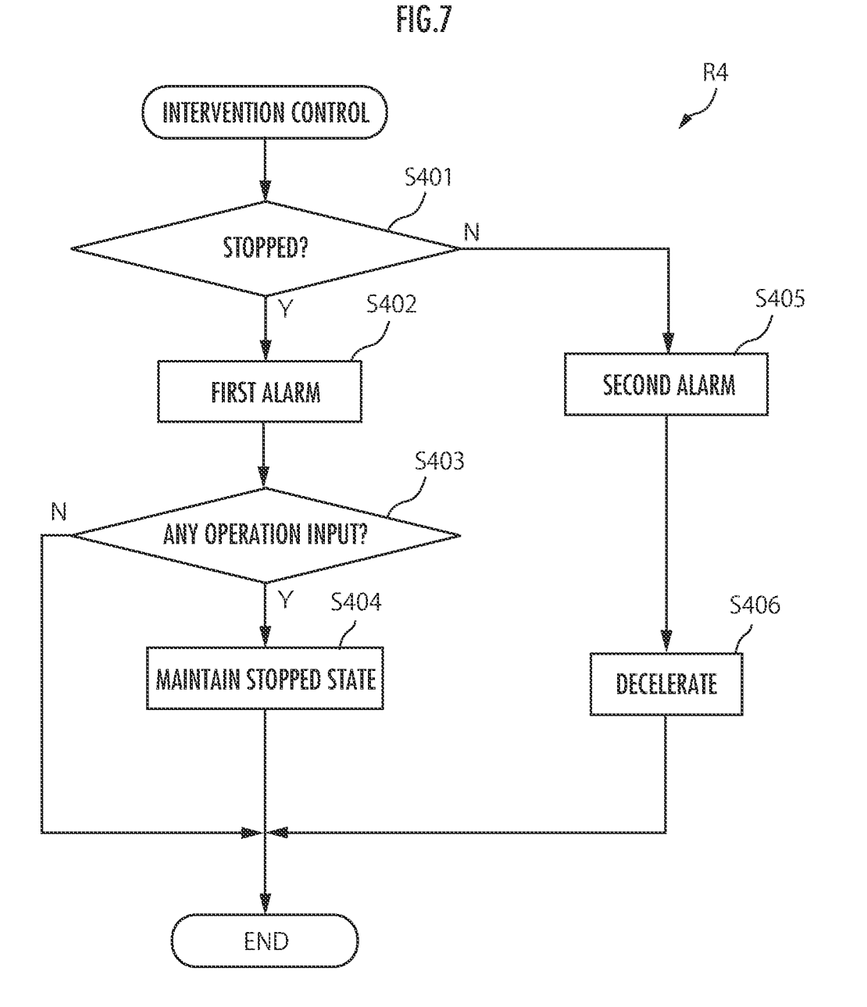
FIG. 7 is a flowchart showing a subroutine of intervention control of a work machine according to Embodiment 2.

FIG. 7 shows a subroutine R4 of intervention control of step S103 of FIG. 4. As shown in FIG. 7, a controller 23 determines whether or not a turning operation of a turning body 12 is stopped (step S401). The controller 23 performs the determination of the step S401 based on operation information acquired from a handle HD by an operation reception unit 23a.

In a case where the controller 23 determines in the step S401 that the turning operation of the turning body 12 is stopped (step S401: Y), the controller outputs first alarm from a speaker SP (step S402).

The controller 23 determines whether or not there is operation input of the handle HD by an operator (step S403). The controller 23 performs the determination of the step S403 based on operation information acquired from the handle HD by the operation reception unit 23a.

In a case where the controller 23 determines in the determination of the step S403 that there is no operation input from the handle HD by the operator (step S403: N), the controller ends the intervention control. That is, the controller 23 does not start turning of the turning body 12 in a case where an obstacle is detected by a sensor SS while the turning of the turning body 12 is stopped.

In a case where the controller 23 determines in the determination of the step S403 that there is the operation input of the handle HD by the operator (step S403: Y), the controller maintains a stopped state of the turning operation (step S404), to end the intervention control. That is, the controller 23 proceeds to the determination of the step S104 of FIG. 4.

This stopped state may be maintained, for example, by canceling the operation input from the handle HD. That is, the controller 23 does not start the turning of the turning body 12 in a case where the obstacle is detected by the sensor SS while the turning of the turning body 12 is stopped.

In a case where the controller 23 determines in the step S401 that the turning operation of the turning body 12 is not stopped, that is, the turning operation is being performed (step S401: N), the controller outputs second alarm from the speaker SP (step S405).

After outputting the second alarm from the speaker SP in the step S405, the controller 23 decelerates the turning operation of the turning body 12 with a deceleration equal to or less than a predetermined deceleration (step S406), to end the intervention control. That is, the controller 23 proceeds to the determination of the step S104 of FIG. 4. Note that the predetermined deceleration in the step S406 may be a deceleration to such an extent that load shaking of a suspended load falls within a predetermined range. Here, the deceleration in the step S406 is performed with the deceleration equal to or less than the predetermined deceleration to reduce a width of the load shaking. This makes it possible to avoid collision of the suspended load with the obstacle.

Note that in a case where a turning speed of the turning body 12 is lower than a predetermined speed, the turning body 12 may be suddenly stopped. In this case, the predetermined speed is a speed at which the load shaking of the suspended load falls within the predetermined range when the turning body 12 suddenly stops.

Furthermore, for example, in a case where an operation of continuing the turning operation is performed to the operation reception unit 23a, the controller 23 may maintain the turning operation without intervening in the operation from the operation reception unit 23a.

As above, according to the crane device 10 of the present embodiment, for example, the controller 23 decelerates the turning of the turning body 12 with the deceleration equal to or less than the predetermined deceleration in emergency, so that the turning can be prevented from being rapidly decelerated. Therefore, for example, it is possible to prevent the load shaking of the suspended load due to sudden stop in emergency.

Embodiment 3

In the subroutine R4 of the intervention control described with reference to FIG. 7 in Embodiment 2, the controller 23 outputs the first alarm from the speaker SP, in a case where there is an obstacle in an area, and a turning operation of a turning body 12 is stopped. A crane device 10 according to Embodiment 3 is different from the crane device 10 according to Embodiment 2 in that the first alarm is emitted in a case where another condition is satisfied in addition to the above conditions.

Figure 8:
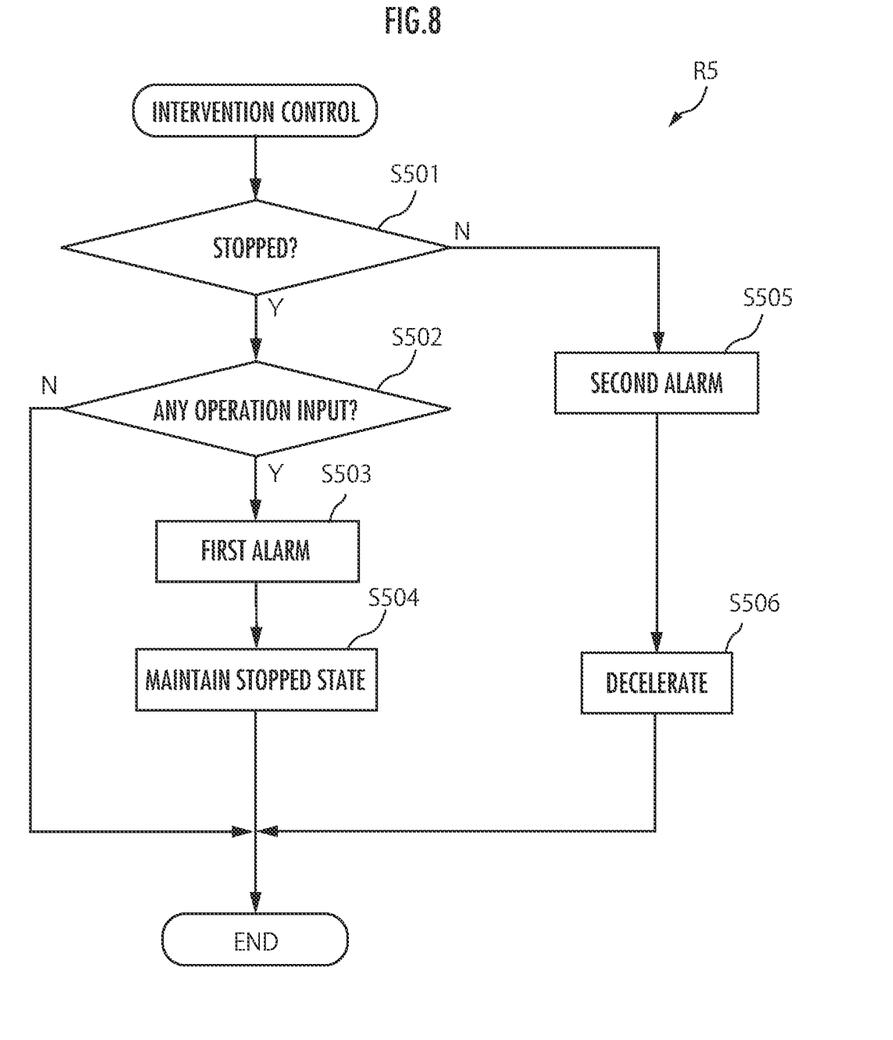
FIG. 8 is a flowchart showing a subroutine of intervention control of a work machine according to Embodiment 3.

FIG. 8 shows a subroutine R5 of the intervention control of the step S103 of FIG. 4. As shown in FIG. 8, a controller 23 determines whether or not the turning operation of the turning body 12 is stopped (step S501). The controller 23 performs the determination of the step S501 based on operation information acquired from a handle HD by an operation reception unit 23a.

In a case where the controller 23 determines in the step S501 that the turning operation of the turning body 12 is stopped (step S501: Y), the controller determines whether or not there is operation input of the handle HD by an operator (step S502). The controller 23 performs the determination of the step S502 based on the operation information acquired from the handle HD by the operation reception unit 23a.

In a case where the operation reception unit 23a determines in the determination of the step S502 that there is no operation input of the handle HD by the operator (step S502: N), the controller 23 ends the intervention control. That is, the controller 23 does not start the turning of the turning body 12 in a case where an obstacle is detected by a sensor SS while the turning of the turning body 12 is stopped. The controller 23 proceeds to the determination of the step S104.

In a case where the operation reception unit 23a determines in the determination of the step S502 that there is the operation input of the handle HD by the operator (step S502: Y), the controller 23 outputs the first alarm from the speaker SP (step S503). The controller 23 maintains a stopped state of the turning operation (step S504), to end the intervention control. That is, the controller 23 does not start the turning of the turning body 12 in a case where the obstacle is detected by the sensor SS while the turning of the turning body 12 is stopped. The controller 23 proceeds to the determination of the step S104 of FIG. 4. Under this situation, the first alarm is outputted from the speaker SP, so that it is possible to encourage the operator not to perform the turning operation until a safe situation is obtained.

In a case where a drive control unit 23c determines in the step S501 that the turning operation of the turning body 12 is not stopped, that is, the turning operation is being performed (step S501: N), the controller 23 outputs second alarm from the speaker SP (step S505). After outputting the second alarm from the speaker SP in the step S505, the controller 23 decelerates the turning operation of the turning body 12 with a deceleration equal to or less than a predetermined deceleration to end the intervention control (step S506). The controller 23 proceeds to the determination of the step S104 of FIG. 4.

Thus, the controller 23 outputs the first alarm from the speaker SP, in a case where the turning operation of the turning body 12 is stopped and the turning operation is performed. Therefore, the crane device 10 can prevent a warning sound from being always emitted in a case where the obstacle enters a danger area DA. Therefore, it is possible to reduce annoyance and stress felt by the operator.

Embodiment 4

Description will be made as to a crane device 10 according to Embodiment 4. The crane device 10 according to Embodiment 4 is different from the crane device 10 according to Embodiment 1 in intervention control subroutine. The crane device is the same as the crane device 10 of Embodiment 1 in the other respects, and hence description thereof will not be repeated.

Figure 9:
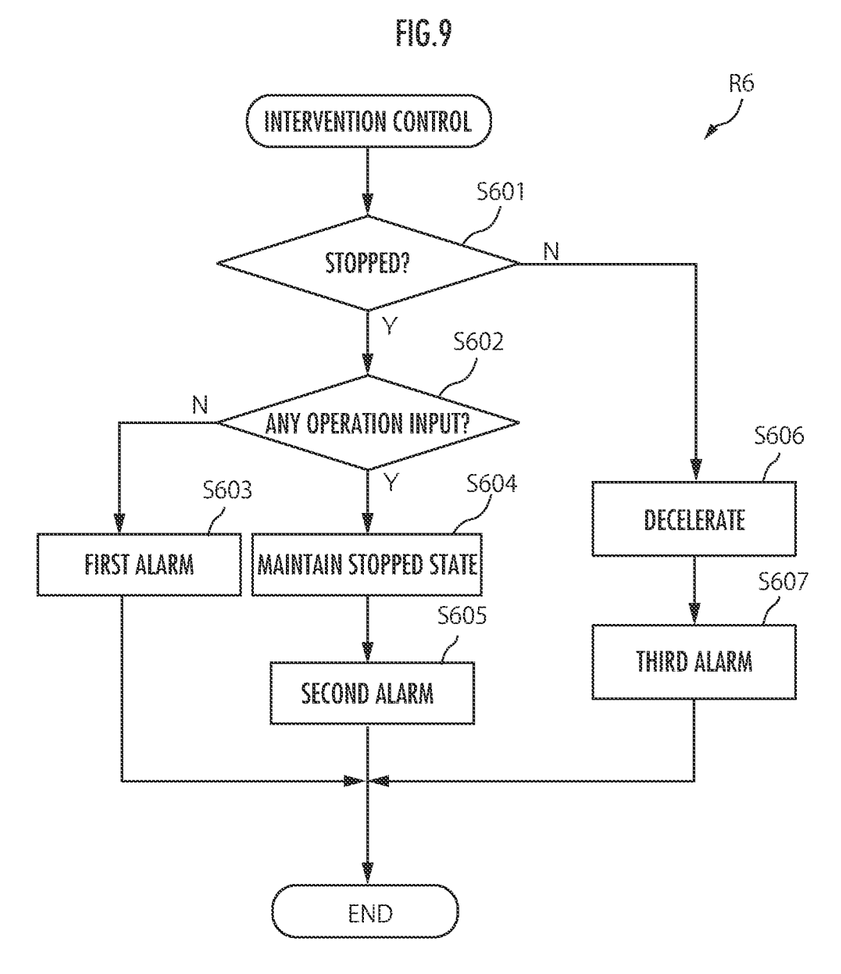
FIG. 9 is a flowchart showing a subroutine of intervention control of a work machine according to Embodiment 4.

FIG. 9 shows a subroutine R6 of intervention control of the crane device 10 according to Embodiment 4. As shown in FIG. 9, a controller 23 determines whether or not a turning operation of a turning body 12 is stopped (step S601). The controller 23 performs the determination of the step S601 based on operation information acquired from a handle HD by an operation reception unit 23a.

In a case where the controller 23 determines in the step S601 that the turning operation of the turning body 12 is stopped (step S601: Y), the controller determines whether or not there is operation input of the handle HD by an operator (step S602). The controller 23 performs the determination of the step S602 based on the operation information acquired from the handle HD by the operation reception unit 23a.

In a case where the controller 23 determines in the determination of the step S602 that there is no operation input of the handle HD by the operator (step S602: N), the controller outputs first alarm from a speaker SP (step S603), to end the intervention control. That is, the controller 23 does not start the turning of the turning body 12 in a case where an obstacle is detected by a sensor SS while the turning of the turning body 12 is stopped. The controller 23 proceeds to the determination of the step S104 of FIG. 4.

In a case where the controller 23 determines in the determination of the step S602 that there is the operation input of the handle HD by the operator (step S602: Y), the controller maintains a stopped state of the turning operation (step S604), and outputs second alarm from the speaker SP (step S605), to end the intervention control. That is, the controller 23 does not start the turning of the turning body 12 in a case where the obstacle is detected by the sensor SS while the turning of the turning body 12 is stopped. The controller 23 proceeds to the determination of the step S104 of FIG. 4.

In a case where the controller 23 determines in the step S601 that the turning operation of the turning body 12 is not stopped, that is, the turning operation is being performed (step S601: N), the controller decelerates the turning operation of the turning body 12 with a deceleration equal to or less than a predetermined deceleration (step S606).

The controller 23 outputs third alarm from the speaker SP (step S607), to end the intervention control. The controller 23 proceeds to the determination of the step S104 of FIG. 4.

Note that the first alarm to the third alarm may be warning sounds of respective various modes.

In the present embodiment, for example, the third alarm, the second alarm and the first alarm may be the warning sounds which are easier for the operator to recognize in this order. Alternatively, in the present embodiment, for example, sound volumes of the warning sounds of the third alarm, the second alarm and the first alarm may be increased in this order.

As above, according to the crane device 10 of the present embodiment, a notification is issued in different modes, so that the operator can easily recognize that, for example, an event that requires attention, such as the suspended load coming into contact with a building or the like might occur. Therefore, the crane device 10 according to the present embodiment can encourage the operator to perform an appropriate operation.

According to a work machine of the present invention, a drive control unit maintains turning of a turning body, in a case where an obstacle is detected by a detection unit during the turning of the turning body. Therefore, it is possible to prevent a turning operation of the turning body from being suddenly stopped. Therefore, for example, load shaking due to the sudden stop of the turning of a crane in emergency can be prevented, and occurrence of the event that requires attention, such as the suspended load coming into contact with a building or the like can be prevented.

Alternatively, the drive control unit may decelerate the turning of the turning body with a deceleration equal to or less than a predetermined deceleration, in a case where the obstacle is detected by the detection unit during the turning of the turning body.

According to this aspect, for example, the turning of the turning body is decelerated with the deceleration equal to or less than the predetermined deceleration in emergency, so that it is possible to prevent a turning speed of the turning body from being rapidly decreased. Therefore, it is possible to prevent load shaking of a suspended load due to sudden stop in emergency.

Alternatively, the work machine may include a notification unit which issues different notifications depending on a mode of the detection of the obstacle by the detection unit and a mode of the turning operation of the turning body.

According to this aspect, an operator can recognize that there is the obstacle based on the notification unit. Therefore, it is possible to encourage the turning operation depending on a situation.

Also, the work machine may include an operation reception unit which receives an operation of turning the turning body, and the notification unit may issue the notification, in a case where the operation reception unit receives the operation while the turning of the turning body is stopped.

According to such an aspect, it is possible to encourage the operator not to perform the turning operation until a safe situation is obtained. Therefore, for example, the load shaking due to sudden stop of turning the crane in emergency can be prevented, and occurrence of an event that requires attention, such as the suspended load coming into contact with a building or the like can be prevented.

Furthermore, the detection unit is capable of measuring a distance from the turning body to the obstacle, and the notification unit may issue the notification in a different mode depending on the distance from the turning body to the obstacle.

According to this aspect, the operator can easily recognize a degree of occurrence of the event that requires attention, such as the suspended load coming into contact with a building or the like. Therefore, it is possible to encourage the operator to perform an appropriate operation depending on the degree.

A work machine in which a turning body is disposed to be turnable relative to a base body, and includes a drive control unit which controls a turning operation of the turning body, and a detection unit which detects an obstacle present around the turning body, and the drive control unit does not start turning of the turning body in a case where the obstacle is detected by the detection unit while the turning of the turning body is stopped, and does not stop the turning of the turning body in a case where the obstacle is detected by the detection unit during the turning of the turning body.

According to the work machine of the present invention, the drive control unit does not stop the turning of the turning body in a case where the obstacle is detected by the detection unit during the turning of the turning body. Therefore, it is possible to prevent the turning operation of the turning body from being suddenly stopped. Consequently, for example, load shaking due to sudden stop of turning of a crane in emergency can be prevented, and occurrence of an event that requires attention, such as the suspended load coming into contact with a building or the like can be prevented.

REFERENCE SIGNS LIST

10 crane device
23a operation reception unit
23b detection control unit
23c drive control unit
23d notification control unit
DV drive unit
SS sensor
SP speaker

The invention claimed is:

1. A work machine in which a turning body is disposed to be turnable relative to a base body, the work machine comprising:
   a control unit including a computer having a memory and a central processing unit which reads processing content from the memory and achieves various functions, and
   sensors which detect an obstacle present around the turning body,
   wherein the control unit comprises a drive control unit which controls a turning operation of the turning body,
   the drive control unit does not start turning of the turning body in a case where the obstacle is detected by the detection unit while the turning of the turning body is stopped, and decelerates the turning of the turning body with a deceleration to such an extent that a load suspended from the turning body does not swing like a pendulum for at least a predetermined period in a case where the obstacle is detected by the detection unit during the turning of the turning body,
   the drive control unit decelerates the turning of the turning body with a deceleration equal to or less than a predetermined deceleration, in the case where the obstacle is detected by the detection unit during the turning of the turning body, and
   a notification device which outputs different notifications to an operator of the work machine depending on a mode of the detection of the obstacle by the sensors and a type of the turning operation of the turning body based on at least turning speed and turning direction.

2. The work machine according to claim 1, wherein the control unit further comprises:
   an operation reception unit which receives an operation of turning the turning body, wherein the notification device performs the notification, in a case where the operation reception unit receives the operation while the turning of the turning body is stopped.

3. The work machine according to claim 1, wherein the detection unit is configured to measure a distance from the turning body to the obstacle, and the notification device performs the notification in a different mode depending on the distance from the turning body to the obstacle.

\* \* \* \* \*